United States Patent [19]
Williams

[11] Patent Number: 5,313,535
[45] Date of Patent: May 17, 1994

[54] OPTICAL PATH LENGTH MODULATOR

[75] Inventor: Gareth F. Williams, Jackson Heights, N.Y.

[73] Assignee: Nynex Corporation, New York, N.Y.

[21] Appl. No.: 842,450

[22] Filed: Feb. 27, 1992

[51] Int. Cl.$^5$ ............................................. G02B 6/12
[52] U.S. Cl. ...................................... 385/14; 385/3; 385/8
[58] Field of Search ................ 385/14, 16, 11, 1, 2, 385/3, 8

[56] References Cited

U.S. PATENT DOCUMENTS

| | | | |
|---|---|---|---|
| 4,433,895 | 2/1984 | Puech et al. | 385/14 X |
| 4,592,043 | 5/1986 | Williams | 370/3 |
| 5,016,958 | 5/1991 | Booth | 385/16 |
| 5,074,630 | 12/1991 | Rodino et al. | 385/14 |
| 5,076,655 | 12/1991 | Bridges | 385/14 X |
| 5,111,517 | 5/1992 | Riviera | 385/11 |

OTHER PUBLICATIONS

S. Petuchowski et al, "A Sensitive Fiber-Optic Fabry-Pert Interferometer" IEEE Journal of Quantum Electronics, vol. QE-17, No. 11, Nov., 1981, pp. 2168-2170.

D. Frazen et al, "Long Optical-Fiber Fabry-Perot Interferometers", Applied Optics, vol. 20, No. 23, Dec. 1, 1981, pp. 3991-3992.

J. Stone et al, "Optical Fibre Fabry-Perot Interferometer with Finesse of 300" IEEE-Inst Elec Eng, Herts, pp. 85-86 (no date).

Primary Examiner—John D. Lee
Assistant Examiner—Phan T. Heartney
Attorney, Agent, or Firm—Loren Swingle; Kenneth Rubenstein

[57] ABSTRACT

An optical integrated circuit comprises an optical substrate and an optical waveguide supported by the substrate. A transducer is incorporated into the optical integrated circuit and coupled to the optical substrate. The transducer comprises a region of piezo-electric material and a set of electrodes for applying a voltage to the piezo-electric material for selectively causing the deformation of the piezo-electric material so as to alter the optical path length of the waveguide.

22 Claims, 10 Drawing Sheets

OPTICAL PATH LENGTH MODULATOR

FIELD OF THE INVENTION

The present invention relates to an optical integrated circuit including an optical waveguide and a piezo-electric material for altering the optical path length of the optical waveguide in response to a voltage applied to the piezo-electric material.

BACKGROUND

Optical waveguides are incorporated in optical integrated circuits for a variety of purposes. In particular, optical waveguides are utilized to form resonator based devices such as receivers, lasers, transmitters, modulators and interferometers. Different types of resonators may be incorporated in these devices such as a linear resonator which comprises a linear waveguide and a reflecting mirror placed on each end of the linear waveguide or a ring resonator which includes a waveguide having the geometry of a ring.

An optical resonator resonates when the round trip phase shift of optical radiation of a particular wavelength propagating in the resonator waveguide equals an integer multiple of $2\pi$. The round trip phase shift in a resonator may be represented by $\omega p/c$, where $\omega$ is the angular frequency of the radiation and p is the round trip optical path-length of the resonator. Thus, the resonant wavelength of a particular optical resonator is strongly dependent on its optical path length.

In many applications, it is desirable to tune a resonator to resonate at a particular wavelength. For example, it might be desirable to tune a laser to generate optical radiation at a particular wavelength. In addition, in a multiple wavelength optical communication system (e.g., as described in the prior art, U.S. Pat. No. 4,592,043, "Wavelength Division Multiplexing Optical Communications", by Gareth F. Williams), it might be desirable to tune a resonator to a specific wavelength to select the specific wavelength out of a plurality of wavelengths arriving at the receiver.

Other applications use waveguide interferometers as intensity modulators. For example, a typical Mach-Zehnder waveguide modulator comprises two waveguides coupled to each other at two points by two evanescent couplers. The modulator has a transmission maximum when the paths in the two waveguides differ by an integral number of optical wavelength and a transmission minimum if the paths in the two waveguides differ by a half-integral number of optical wavelengths. Thus, it is desirable to control the transmission of the modulator by varying the difference between the optical path lengths in the two waveguides.

In other applications, such as coherent lightwave receivers, it is desirable to vary the phase of an optical signal or radiation. This may be done by varying an optical path length and thereby the phase.

In conventional optical integrated circuits, waveguides may be manufactured with lithium niobate materials. At present, waveguides formed from these materials have unacceptably high losses for many applications. In optical integrated circuits, waveguides may also be formed from glass materials. However, there is presently no suitable way to alter the optical path length of a glass waveguide formed in an optical integrated circuit device, for example, to form a tunable resonator. Accordingly, it is an object of the present invention to provide an optical integrated circuit including a low-loss waveguide and a means for varying the optical path length of the waveguide.

In the prior art (see, e.g., D. L. Franzen and E. M. Kim, "Long Optical-fiber Fabry-Perot Interferometers," Applied Optics, vol. 20, No. 23, pp. 3991–3992, 1981; S. J. Petuchowski, T. G. Giallorenzi, and S. K. Sheem, "A Sensitive Fiber-Optic Fabry-Perot Interferometer," IEEE Journal of Quantum Electronics, vol. QE-17, no. 11, pp. 2168–2170, 1981; and J. Stone, "Optical-Fiber Fabry-Perot Interferometer With Finesse of 300," Electronics Letters, vol. 21, pp. 50–4505, 1985), a piezo-electric device has been coupled to an optical fiber to modulate the length of the optical fiber. However, a piezo-electric material has not heretofore been incorporated in an optical integrated circuit to alter the optical path length of a waveguide.

Accordingly, it is a further object of the present invention to provide an optical integrated circuit incorporating a piezo-electric (PZT) material for changing the optical path length of a waveguide.

SUMMARY OF THE INVENTION

In accordance with the present invention, an optical integrated circuit incorporates a piezo-electric material to modulate the length of an optical waveguide. Illustratively, such an optical integrated circuit comprises a piezo-electric base layer or insert or overlay, a first electrode formed on a first surface of the piezo-electric base layer and a second patterned electrode formed on a second surface of the piezo-electric base layer. An optical substrate layer is formed on the second surface of the piezo-electric base layer on top of or in proximity to the patterned electrode. The optical substrate layer serves to support an optical waveguide. The second patterned electrode layer is patterned so that a voltage applied between the first electrode and the patterned electrode deforms a portion of the piezo-electric base layer located (or extending) under the optical waveguide so as to alter the optical path length of the optical waveguide. Thus, in particular applications, the path length of the waveguide may be modulated so that it forms a resonator for a particular optical wavelength, or, in modulator applications, the path-length of the waveguide may be modulated to modulate the amplitude or phase of the optical signal.

In an alternative embodiment, the second patterned electrode may also be formed on the first surface of the piezo-electric base layer, in proximity to the first patterned electrode. The optical waveguide may be formed on top of either or both electrodes or between the electrodes. The operation is similar to that of the first embodiment described in the previous paragraph.

DETAILED DESCRIPTION OF THE INVENTION

Figure 1:
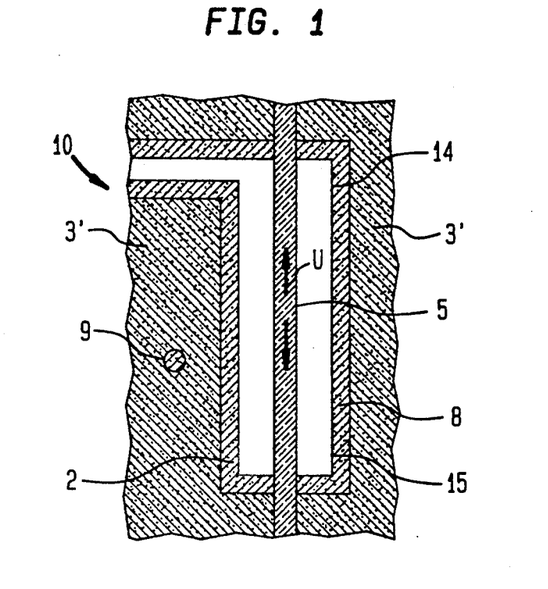
FIG. 1 illustrates a top view of an optical integrated circuit according to the present invention, which optical integrated circuit comprises a piezo-electric base layer with a first electrode on one surface, a second patterned electrode on the opposite surface and an optical substrate layer supporting a waveguide formed on the piezo-electrode base layer on top of the patterned electrode.
Figure 2:
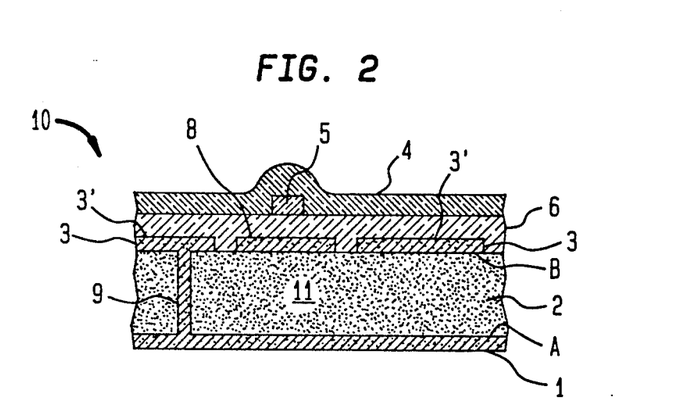
FIG. 2 illustrates a cross-sectional view of the optical integrated circuit of FIG 1.

FIG. 1 depicts a top view and FIG. 2 depicts a cross-sectional view of an embodiment of an optical integrated circuit 10 according to the invention. The optical integrated circuit 10 comprises a piezo-electric base layer 2. A first electrode layer 1 is formed on a first surface A of the piezo-electric base layer 2. A second electrode layer 3 is formed on the opposite surface B of the piezo-electric base layer 2. The second electrode layer 3 is patterned so as to include the drive electrode 8 and the inactive portions 3, The drive electrode 8 is formed in the second electrode layer 3 by a technique which is well known in the art such as photolithographic etching. An optical substrate layer 6 is formed on top of the piezo-electric base layer 2 and electrode layer 3. An optical waveguide 5 is supported by the optical substrate layer 6. An optical cladding layer 4 is formed on top of the waveguide 5 and optical substrate layer 6.

The waveguide 5 is formed from a material which has a higher index of refraction than the materials which form the optical substrate layer 6 and cladding layer 4. Typically, this is achieved by depositing a glass layer on top of the 10 optical substrate layer 6 and etching the waveguide 5 using photolithographic methods such as those developed for semiconductor integrated circuit fabrication. Thereafter, the cladding layer 4 is formed on top of the optical substrate layer 6 and the waveguide 5. The optical substrate layer 6 and cladding layer 4 serve to laterally confine optical radiation within the waveguide 5 so that optical radiation is constrained to propagate axially (i.e., in the direction of the arrows C of FIG. 1).

Alternatively, the waveguide 5 may be defined in the optical substrate layer 6 by diffusing impurities into the optical substrate layer 6 in accordance with a predetermined pattern to define a waveguide in the layer 6. The impurities alter the refractive index in the regions where they are located. After a waveguide is defined in the top surface of a first glass layer 6 through use of selective diffusion, a second glass cladding layer may sometimes be deposited on top of the first glass layer. Or, one may choose to use electric-field-assisted diffusion to move the waveguide below the surface.

Preferably, the piezo-electric base layer 2 is made of a ceramic PZT material such as lead zirconate titanate, barium titanate, lead titanate, lead metaniobate, lead magnesium niobate, etc. (the listed compounds are all readily commercially available). Piezo-electric materials are materials that deform under an applied voltage. The direction and extent of the deformation depend upon the piezo-electric material used and the direction and magnitude of the electric field applied to the piezo-electric material.

The arrangement of the electrode layers 1 and 3 and the drive electrode 8 on the piezo-electric base layer 2 as depicted in FIG. 2 define a piezo-electric transducer or active region 11. Depending on the magnitude of a drive voltage that appears between the drive electrode 8 and the electrode layer 1, the piezo-electric active region 11 will expand or contract. In FIG. 2, the piezo-electric active region 11 lies underneath the optical substrate layer 6 and the optical waveguide 5. Any deformation in the piezo-electric active region 11 induces a local strain in the waveguide 5 which alters its length. The deformation of the waveguide 5 changes its optical path length in the direction of the arrows labeled by C in FIG. 1.

Alternatively (not shown), the waveguide need only pass near or along the edge of the PZT region 11, in which case it is still deformed, hence stretched or compressed, by the strain created by the PZT region. Generally, the electrode layer 1 is grounded. The inactive portions 3' of the electrode layer 3 may also be grounded, for example, through use of the electrode material 9 which extends through an opening in the piezo-electric base layer 2 to connect with the grounded electrode 1. Alternatively, bonding wires may be utilized to connect the inactive electrode portions 3' with ground.

Generally, an optical integrated circuit includes a plurality of waveguides. In particular applications, it may be desirable to modulate the path lengths of these waveguides at different times or by different amounts. To accomplish this, the electrode layer 3 may include a plurality of drive electrode regions 8. The individual drive electrode regions 8 are positioned to deform particular portions of the piezo-electric base layer 2 so as to cause a change in path length of a corresponding waveguide supported by the optical substrate 6.

Figure 3:
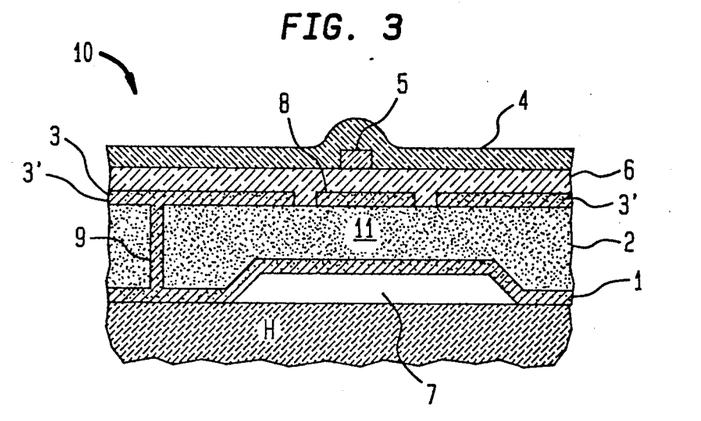
FIG. 3 illustrates a cross-sectional view of an alternative embodiment of an optical integrated circuit in which a recess is formed in the piezo-electric base layer.

Optionally, as depicted in FIG. 3, a recess 7 may be formed in the PZT base layer 2 by machining or forming or molding or other means well known in the art. The inclusion of the recess 7 optimizes the operation of the optical integrated circuit 10 in several ways. First, the recess 7 reduces the thickness of the PZT base layer 2 thereby reducing the drive voltage necessary to deform the PZT active region 11. The recess 7 further provides a means for cementing or affixing, by other means well known in the art, the optical integrated circuit 10 to a header H, without preventing the PZT region from expanding or contracting.

In one exemplary implementation, the PZT base layer 2 has a thickness of 0.030". The electrode layers 1 and 3 are formed from a metal-glass frit, e.g., a silver-glass frit, as is commonly used on many commercial PZTs. The thickness is approximately 0.0005". The optical substrate layer 6 is formed from any suitable optical glass or from fused quartz and has a thickness of 6 mils (150 μm) after polishing flat. The waveguide 5 has a thickness of 5 μm, a width of 12 μm, and is formed from a higher-index glass composition; the core-to-cladding index being chosen in the single mode range. The waveguide pattern is formed by photolithographic means that are well-known in the electronic IC art. The cladding layer 4 is formed from the same material as the optical substrate layer 6 and has a thickness of 100 μm.

Other implementations will readily be apparent to those skilled in the art. For example, other conductive layers that can be deposited on or adhered to the substrate could have been used. Candidates include but are not limited to evaporated, deposited, electro-plated, or silk-screened materials, as deposited and patterned in the IC, hybrid IC or printed circuit board industries. Similarly, the glass waveguide could have been formed by diffusion rather than as a separate layer.

As depicted in FIG. 1, when viewed from the top, the drive electrode 8 is rectangular in shape so as to define a rectangular piezo-electric active region or transducer 11. When the PZT base layer 2 expands in the active region 11 it partially compresses the regions 14 and 15 which are located near the ends of the optical waveguide 5 thereby partly cancelling the stretching of the optical waveguide in the active region. This reduces the responsiveness of the optical path length of the waveguide 5 to the voltage applied to the drive electrode 8.

Figure 4:
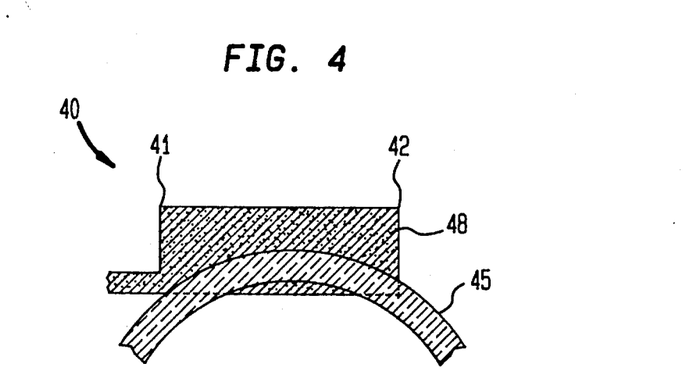
FIG. 4, FIG. 5, and FIG. 6 illustrate optical integrated circuits in which the patterned electrode and/or waveguide are curved.
Figure 5:
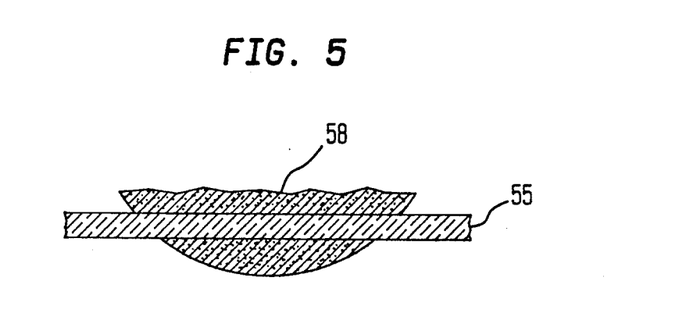
Figure 6:
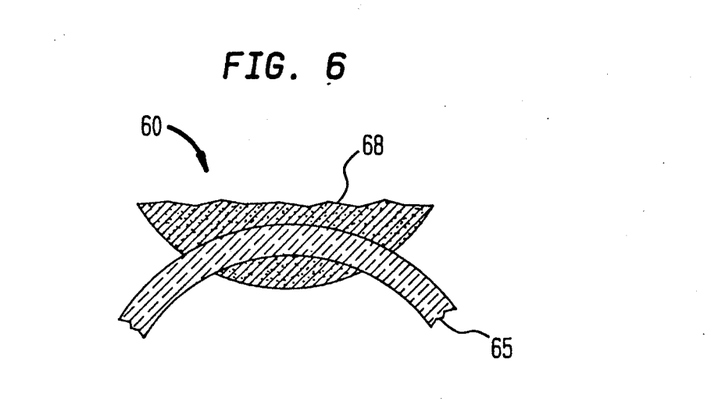
Figure 7:
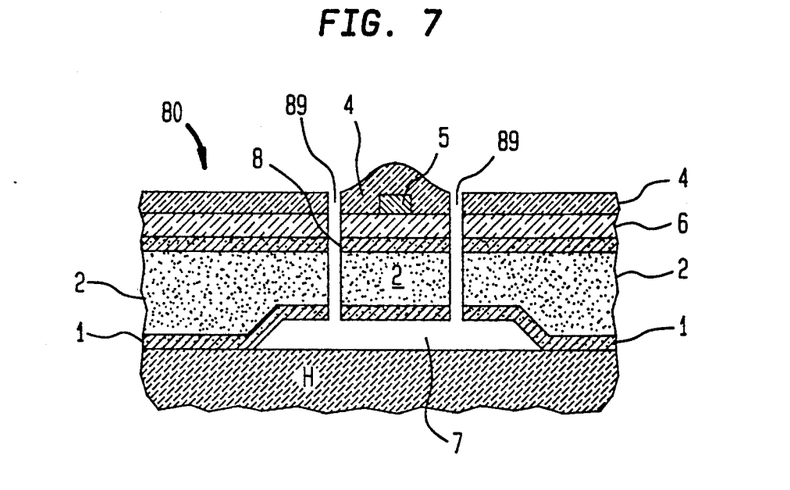
FIG. 7 and FIG. 8 illustrate optical integrated circuits wherein the piezo-electric base layer includes stress relief slots.
Figure 8:
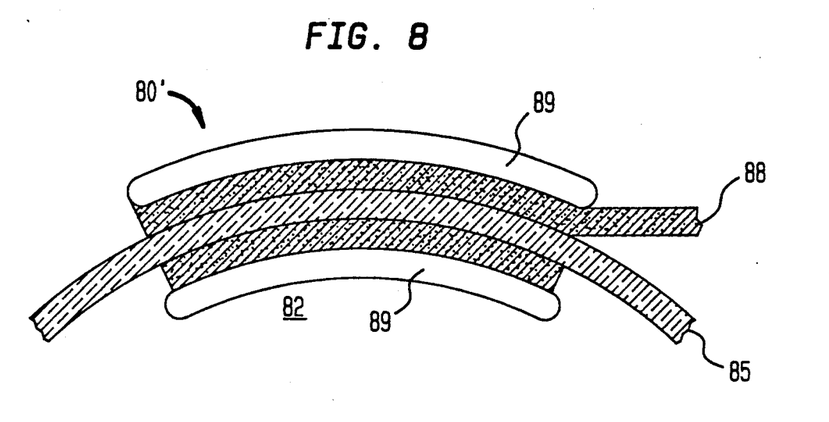

The optical integrated circuit of the present invention may be designed to increase the sensitivity of the waveguide optical path length to the voltage applied to the drive electrode. FIG. 4 10 depicts a top view of an optical integrated circuit 40 with such increased sensitivity. Only the waveguide 45 and drive electrode 48 are illustrated. Here, the waveguide 45 is curved and only partially passes over the PZT active region defined by the drive electrode 48. Specifically, the waveguide 45 passes over the center of the drive electrode 48 but not the ends 41 and 42 where compression is greatest. The net effect is a substitution of shear strain, which has no effect on the optical path length, for some of the undesired compressive strain at the waveguide ends. Alternatively, as depicted in FIGS. 5 and 6, respectively, the drive electrode 58 of the optical integrated circuit 50 may be curved with a linear waveguide 55 or, in the case of the optical integrated circuit 60, both the waveguide 65 and drive electrode 68 may be curved. In either case, the waveguide is positioned to avoid the greatest region of compressive strain caused in the piezo-electric base layer by applying a voltage to the drive electrode. An alternative approach to improving device sensitivity is to utilize relief grooves or slots. For example, as depicted in FIG 7 (cross-section) and FIG. 8 (top view), the optical integrated circuit 80 incorporates stress relieving slots 89 formed within the PZT base layer 2, optical substrate layer 6 and optical cladding layer 4. The relief slots 89 are oriented parallel to the waveguide 5. Thus, when a voltage appears between drive electrode 8 and electrode layer 1 the region below the drive electrode will either elongate or compress. Because of the slots 89, however, the optical integrated circuit 80 accommodates this change in length by bowing towards one of the slots 89. These slots 89, by creating a flex region adjacent to the waveguide 5, substitute a flexure for some of the unwanted compression. Further, by reducing stresses in the surrounding substrate, the sensitivity of the optical integrated circuit 80 is increased.

Figure 9:
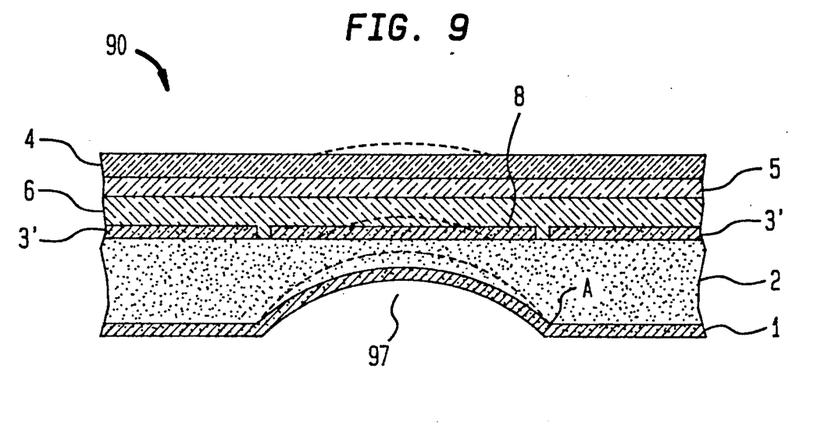
FIG. 9 and FIG. 10 illustrate optical integrated circuits in which the piezo-electric base layer is shaped to relieve stress.
Figure 10:
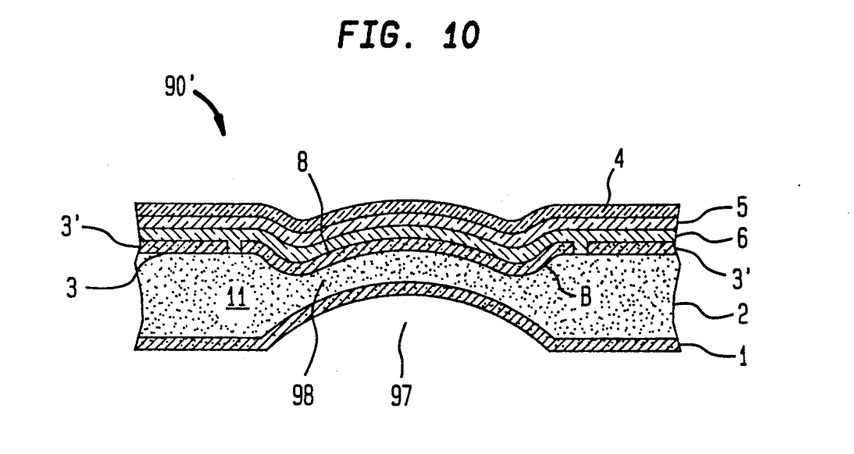

Note that it is disadvantageous for the PZT material in the PZT base layer to be allowed to reach the buckling threshold as this would cause a sudden increase in the length of the optical waveguide with hysteresis in the opposite direction. These side effects are undesirable in the optical integrated circuit 80. In the optical integrated circuit 80' of FIG. 8, the PZT active region, as defined by drive electrode 88, is curved in order to avoid the undesirable response associated with buckling. The waveguide 85 is also curved as are the stress relief slots 89. Because a curved PZT region is pre-buckled it by-passes the buckling threshold thereby avoiding both hysteresis and reduced sensitivity. Other patterns for stress relief grooves or slots that substitute shear or flexure for compression will be readily apparent to those skilled in the art. The PZT active region may also be curved in the surface of the layers as depicted in FIGS. 9 and 10. FIG. 9 depicts an optical integrated circuit 90 with a concave or arched recess 97 machined or etched or formed in the lower surface of the PZT base material 2. Alternatively, as depicted in FIG. 10, an optical integrated circuit 90' includes a PZT base layer 2 with an arch 98 formed in the top surface B. The drive electrode 8 of the optical integrated circuit 90' preferably covers most of the arch 98 and extends further than the arch 98 in the direction of the waveguide 5 so that any imperfections in the cladding layer 4 caused by the gaps between the drive electrode 8 and the inactive portions 3' of the electrode layer 3 may be polished out. Such machining allows the PZT active region 11 under drive electrode 8 to dimple in and out in the plane of the surfaces (with the waveguide 5, optical cladding layer 4 and optical substrate layer 6 dimpling therewith) when a voltage is applied between the drive electrode 8 and the electrode layer 1. In addition, the thickness of the active PZT region 11 of the PZT base layer 2 is reduced, thereby reducing the necessary drive voltage and increasing the sensitivity of the path length of the waveguide 5 to voltages applied to the drive electrode 8.

Although several different PZT materials may be used in constructing an optical path length modulator according to this invention, ceramic materials are preferred at present. However, many ceramics have a relatively high mechanical Q leading to mechanical ringing. Mechanical ringing can travel through the optical integrated circuit and affect other devices formed therein. It is therefore desireable to reduce mechanical ringing in the inventive optical integrated circuit.

Figure 11:
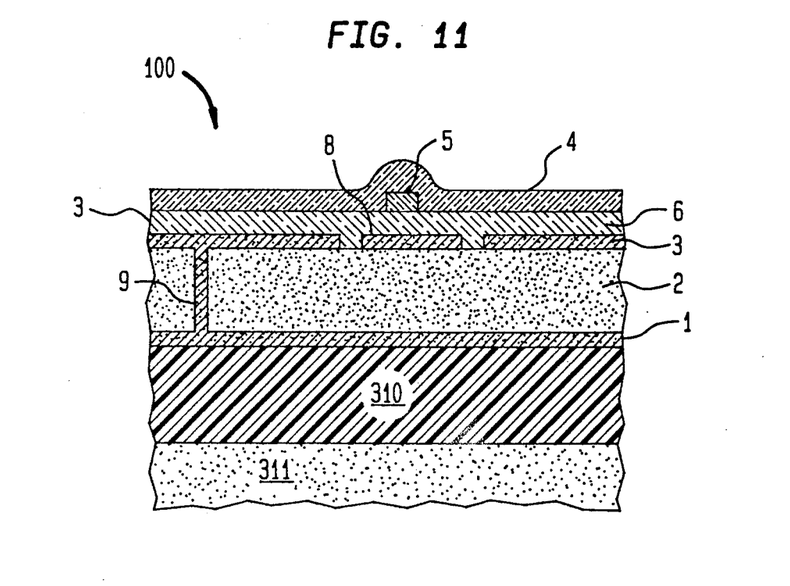
FIG. 11 and FIG 12 illustrate the use of damping material to reduce mechanical vibrations in the optical integrated circuit of the present invention.
Figure 12:
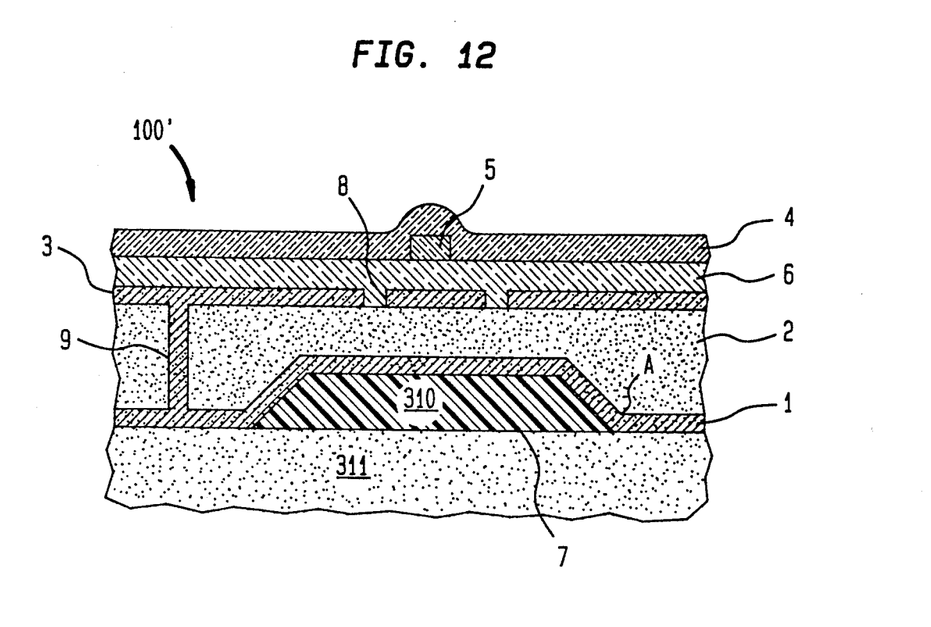

One method of reducing mechanical ringing may be understood in connection with the optical integrated circuit 100 of FIG. 11. The optical integrated circuit 100 is mounted to a header or package 311. Interposed between the header 311 and the electrode layer 1 is a damping material 310. The damping material 310 may be any material with good vibration absorbing properties including a wide variety of plastics such as polyurethanes and some epoxies. FIG. 12 depicts a variation of the optical integrated circuit 100 shown in FIG. 11. The optical integrated circuit 100' of FIG 12 has a recess 7 formed within the surface A of the piezo-electric base layer on which the first electrode layer 1 is formed. This arrangement is preferable because the recess 7 may be filled with a damping material 310 and the remainder of the base layer 2 may be secured to a header or package 311. Damping material may also be placed in the stress relief slots described above.

Figure 13:
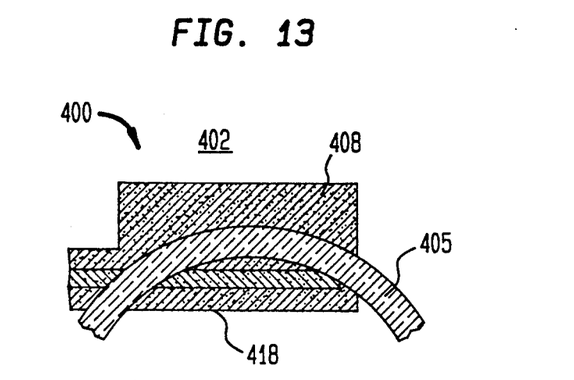
FIG. 13 and FIG. 14 illustrate optical integrated circuits including a sense electrode coupled to the piezo-electric base layer to sense deformations therein.

Note that plastic PZT materials typically have lower mechanical Qs than ceramic PZT materials, and thus are less subject to ringing. If a plastic PZT substrate is sued, typically any number of well-known optical plastics may be used to form the optical layers. Other waveguide materials are also contemplated. Feedback may also be utilized to improve the response of the optical integrated circuit. In FIG. 13, the optical integrated circuit 400 is depicted having a drive electrode 408 and a curved waveguide 405. The optical integrated circuit 400 also possesses a sense electrode 418 formed on the PZT base layer 402 defining a PZT sensing region. Just as a voltage applied to the drive electrode 408 causes the PZT active region underneath to deform, a deformation in the PZT sensing region under the sensing electrode 418 induces a voltage on the sensing electrode which may be measured and processed. The signals obtained from the sensing electrode 418 may be used to obtain velocity feedback, or short term position feedback or processed in a variety of other ways to optimize the response of the optical integrated circuit. To optimize the operation of the sensing electrode 418, a length of grounded electrode, similar to the inactive electrode portions 3' of the layer 3 of FIG. 1, may be formed on the surface of the PZT base layer 402 between the sense electrode 418 and the drive electrode 408 to isolate them from each other.

Figure 14:
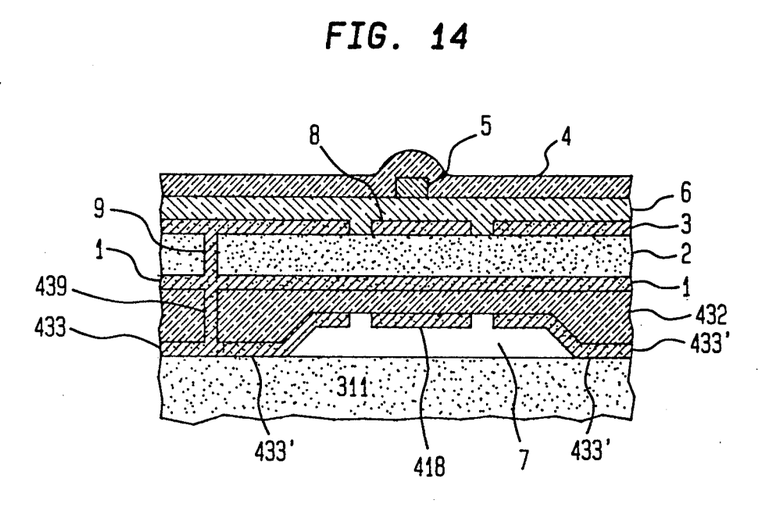

Alternatively, the arrangement of FIG 14 may be used. Here, the optical integrated circuit 410 has a second PZT base layer 432 formed on the first electrode 1, the first electrode 1 being sandwiched between the first PZT base layer 2 and second PZT layer 432. In this case the first PZT layer 2 is a drive layer and the second PZT layer 432 is a sense layer. The sense PZT base layer 432 has an electrode layer 433 including an active sensing electrode portion 418. The inactive portions 433, of the layer 433 ar connected to the grounded electrode layer 1 via the holes 439. The grounded electrode layer 1 acts as an electrostatic shield between the drive PZT base layer 2 and the sense PZT base layer 432. The operation of the optical integrated circuit 410 of FIG 14 is otherwise similar to that of optical integrated circuit 400 of FIG. 13. The drive PZT base layer 2, when deformed by the drive electrode 8, deforms the sense PZT base layer 432 which induces a voltage on the sense electrode 418.

Figure 15:
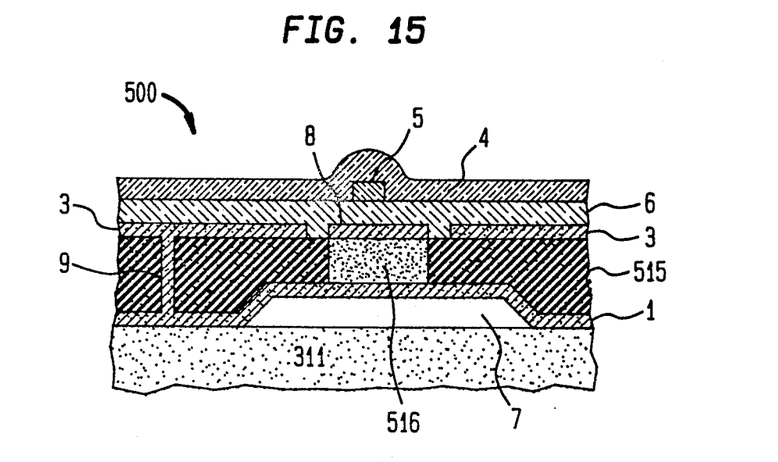
FIG. 15, FIG 16, and FIG. 17 illustrate optical integrated circuits wherein the base layer is formed partly from a non-piezo-electric material and partly from a piezo-electric material.

In the fabrication of optical integrated circuits according to the present invention, it is not necessary for the base layer to be entirely of a piezo-electric material. Composite substrates are also possible comprising non-piezo-electric base layers which incorporate PZT regions. For example, FIG. 15 depicts an optical integrated circuit 500 having a non-piezo-electric base layer 515 with a PZT region 516 formed therein. The base layer 515 may comprise a variety of materials well known in the art. The choice of materials affects the manner of manufacturing the optical integrated circuit 500. For instance, if the base layer 515 is made of a non-piezo-electric ceramic and the PZT region 516 is also ceramic, the base layer 515 and PZT region 516 may be fired together. The surfaces may then be polished flat and the electrode layers 1 and 3 and the cladding layer 4, waveguide 5 and optical substrate layer 6 formed as before. Alternatively, the base layer 515 may be molded around inserts of PZT material. This technique is especially applicable to plastic base layers 515 and plastic PZT regions 516.

Figure 16:
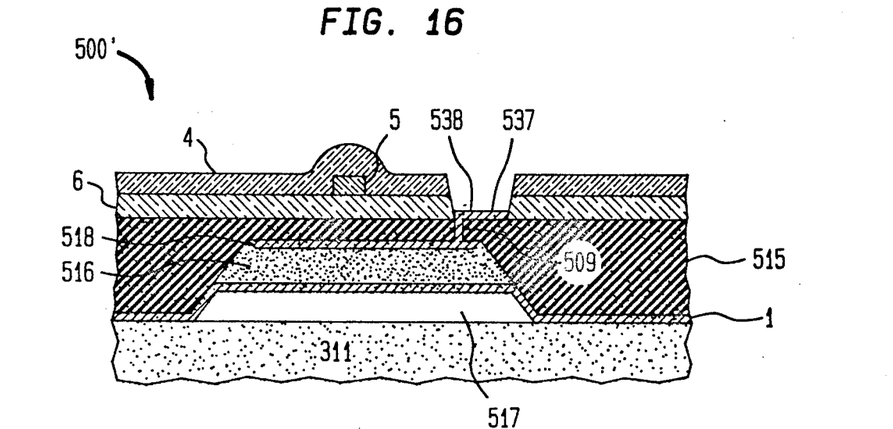
Figure 17:
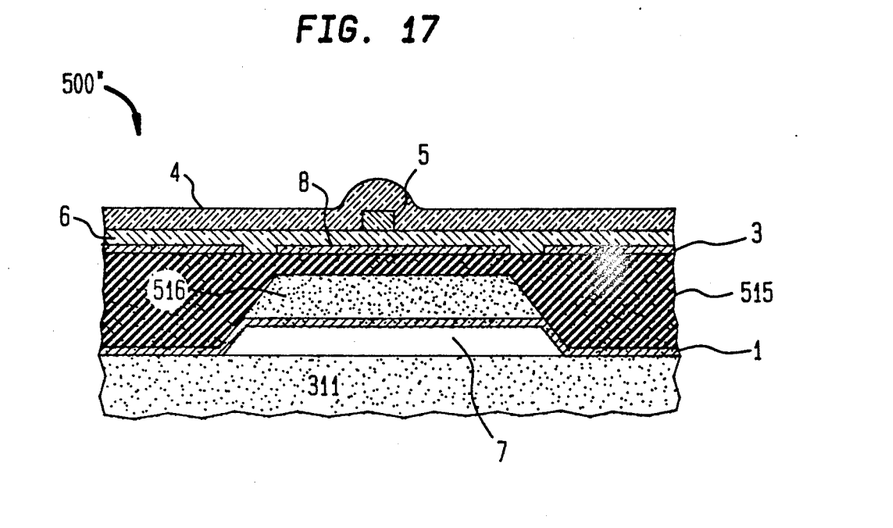

The PZT region 515 does not have to be formed directly below the cladding layer 4 and optical substrate layer 6. Alternatively, as depicted in FIG. 16, an optical integrated circuit 500' includes a recess 517 formed in the bottom surface of the non-piezo-electric base layer 515. Thereafter, the recess 517 may be filled with a PZT material to create a PZT region 516 and an electrode 1 may thereafter be formed on the bottom surface of the PZT region 516 and the base layer 515. Such an arrangement may be manufactured by machining the base layer 515 and then back-filling the PZT region 516 or by forming the base layer 515 by such processes as calibrated etching, stop etching, molding or other means well known in the art. In the device 500' of FIG. 16, a drive electrode 518 is sandwiched between the PZT region 516 and the bottom surface of the base layer 515. To access the electrode 518, a well 537 may be formed in the cladding layer 4 and optical substrate layer 6 to expose a portion of the surface of the base layer 515. A bonding pad 538 may be formed in the well 537 which may be connected to the electrode 518 by a passageway 509 filled with electrode material. Alternatively, the drive electrode 518 could be connected from out of the bottom surface. FIG. 17 depicts a variant 500'' wherein the electrode layer 3 is formed on top of the non-piezo-electric base layer 515. In the operation of this device, the applied voltage to drive electrode 8 divides between the PZT region 516 and the non-piezo-electric base layer 515 roughly according to their dielectric constants.

Figure 18:
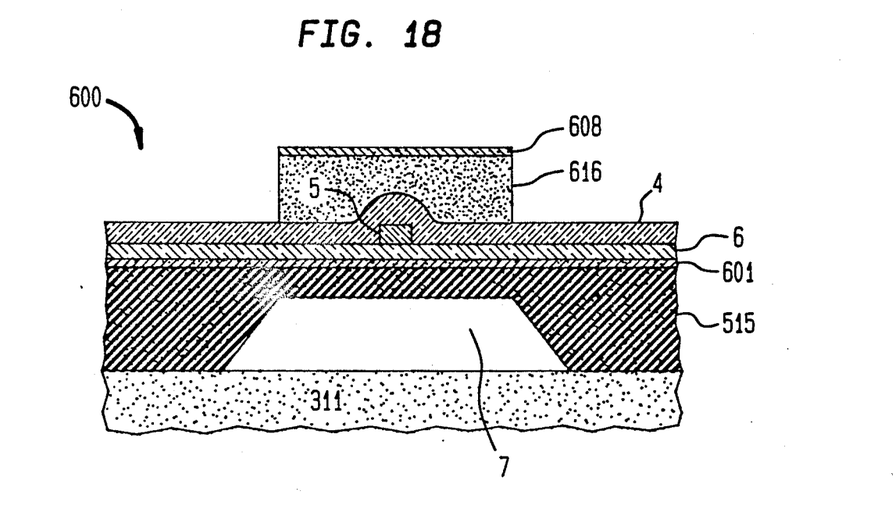
FIG. 18 illustrates an optical integrated circuit including a non-piezo-electric base layer and a piezo-electric transducer.

FIG. 18 depicts an alternative optical integrated circuit 600 in which a PZT region 616 is formed on top of cladding layer 4 and optical substrate layer 6. A drive electrode 608 is formed on the top surface of the PZT region 616. In this example, an additional electrode 601, which for example is a grounded electrode, is formed in between the non-piezo-electric base layer 515 and the optical substrate layer 6. Alternatively, electrode 601 could be formed above optical layer 4, directly under PZT region 616.

In yet another implementation (not shown), a separate PZT chip is cemented or soldered or adhered onto the substrate above or adjacent to the waveguide. One technique is to deposit a conductive layer and solder the PZT chip to the conductive layer. Note that the soldering technique can be made semi self-aligning, in a manner directly analogous to the "flip-flip" technology used in some hybrid ICs.

In yet another implementation (not shown), a conventional optical integrated circuit is cemented or soldered or adhered to a PZT substrate with patterned electrodes and other features as described above. Alternatively, the PZT substrate may be deposited or formed or fabricated on (under) the optical substrate, rather than vice versa; the resultant structures are similar to those described above.

Note also that a variety of optical materials and optical IC technologies are contemplated. These include, but are not limited to glass, glass-on-silicon, plastic, silicon/semiconductor, and other technologies. In fact, these techniques may be used with most optical IC technologies.

An optical integrated circuit formed in accordance with the present invention may be utilized to implement a variety of optical devices.

Figure 19:
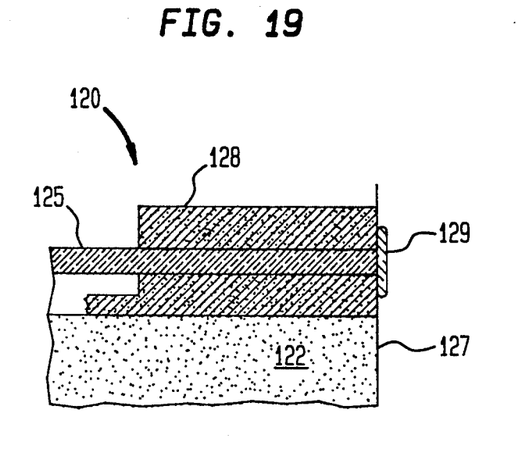
FIG. 19 illustrates a linear resonator in accordance with the present invention.

FIG. 19 depicts a top view of an embodiment of an optical integrated circuit in accordance with the present invention including a linear resonator referred to by 120. The resonator 120 is formed by the waveguide 125. A mirror 129 is positioned at the end of the waveguide 125. Note that the location of the mirror 129 coincides with the edge of the PZT active region as defined by the drive electrode 128. In such an arrangement, any compression on the other side of the mirror 129 is outside the optical system and has no effect on the operation of the linear resonator 120. Alternatively, a recess may be formed beyond the mirror 129 or the mirror 129 may be arranged to coincide with the edge 127 of the PZT base layer 122 to reduce undesired stresses.

Figure 20:
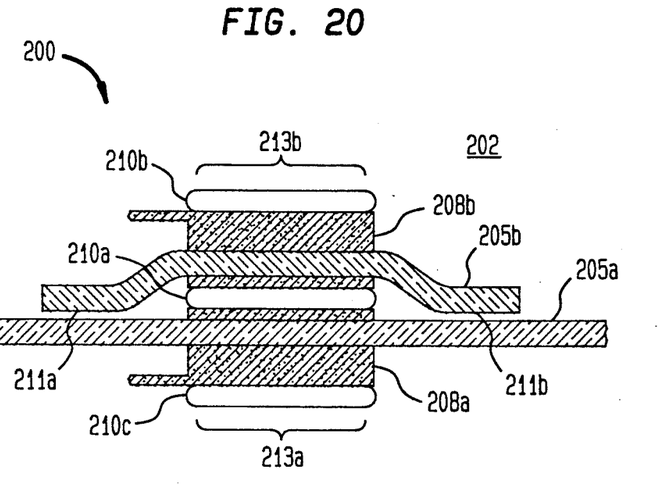
FIG. 20 illustrates a Mach-Zender intercavity element in accordance with the present invention.

A Mach-Zehnder intercavity element is illustrated in FIG. 20. The Mach-Zehnder Intercavity element 200 of FIG. 20 comprises the waveguides 205a and 205b. The waveguides 205a and 205b are evanescently coupled at the regions 211a and 211b. The waveguides 205a and 205b are formed in an optical substrate such as the optical substrate 6 of FIG. 2, which optical substrate 6 is formed on a piezo-electric base layer such as the piezo-electric base layer 2 of FIG. 2. In particular, the waveguide 205a is formed over the drive electrode 208a and the waveguide 205b is formed over the drive electrode 208b. As indicated above, both electrodes 208a and 208b define active regions of a piezo-electric base layer (not shown in FIG. 20). The intercavity element 200 also includes the stress relief slots 210a, 210b, and 210c. The resulting structure for modulating the path length of the optical waveguide 205a is designated 213a and the resulting structure for modulating the path length of the optical waveguide 205b is designated 213b.

The intercavity element 200 of FIG. 20 can serve as a modulator. For example, radiation propagating in the waveguide 205a from the left to the right is evanescently coupled into the waveguide 205b at the leftmost coupling region 211a. The radiation in the waveguide 205b is coupled back into the waveguide 205a at the rightmost coupling region 211b. Depending how the path lengths of the waveguides 205a and 205b are regulated by the path length modulating structures 213a and 213b, a particular phase difference is introduced between the radiation propagating in the waveguide 205a and the radiation propagating in waveguide 205b. Thus, there is constructive interference or destructive interference or some intermediate level of interference when the radiation from the two waveguides is recombined. It should be noted that a desired relative phase difference may be achieved by applying voltages of opposite polarity to the drive electrodes 208a and 208b. By switching between constructive and destructive interference, the intensity of the radiation propagating in the waveguide 205a may be modulated with an information signal. It should be noted that the coupling regions 211a,b may be implemented by Y-couplers instead of evanescent couplers.

Another device which may be implemented in accordance with the present invention is a tunable ring resonator. An example of such a resonator is illustrated in FIG. 21.

Figure 21:
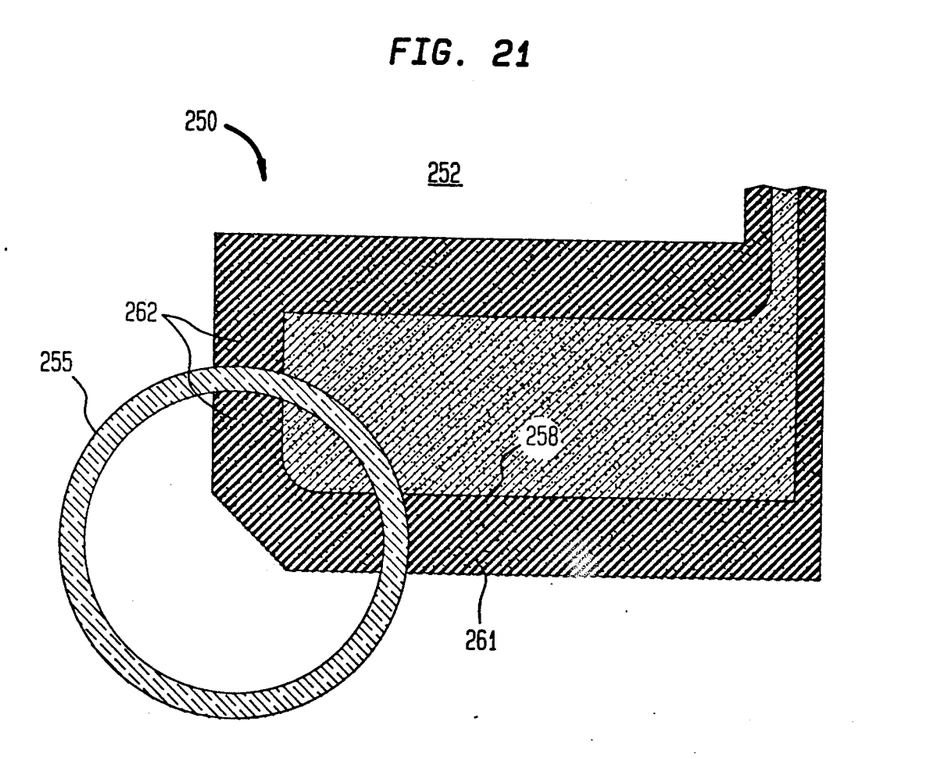
FIG. 21 illustrates a ring resonator in accordance with the present invention.

The resonator 250 of FIG. 21 comprises a ring shaped waveguide 255. This waveguide is formed as previously described on an optical substrate layer (not shown in FIG. 21) which itself is formed on top of a piezo-electric base layer schematically designated 252. A drive electrode 258 is formed between the PZT base layer 252 and the optical substrate layer which supports the waveguide. The drive electrode 258 is patterned to define an active region in the PZT layer which overlaps part of the ring waveguide 255. In the operation of the ring resonator 250, a voltage is applied to drive electrode 258 thereby deforming the active PZT region thereunder. The portion of the waveguide 255 over the region 262 of the electrode 258 is compressed or stretched to modulate the circumferential length of the ring waveguide. Similarly, the portion of the waveguide 255 over the region 261 is shear-strained.

In short, an optical path modulator for use in an optical integrated circuit has been disclosed. An optical waveguide is formed near a piezo-electric transducer. Modulation of the optical path length of the waveguide is achieved by applying a voltage to the piezo-electric transducer to deform it and to also deform the nearby optical waveguide to alter its path length.

Finally, the above-described embodiments of the invention are intended to be illustrative only. Numerous alternative embodiments may be devised by those skilled in the art without departing from the spirit and scope of the following claims.

I claim:

1. An optical integrated circuit comprising:
   an optical substrate;
   an optical waveguide supported by said optical substrate;
   a transducer incorporated in said optical integrated circuit and coupled to the optical substrate for selectively controlling a path length of the optical waveguide, said transducer comprising:
   a region of piezoelectric material; and
   electrode means for applying a voltage to said piezoelectric material to selectively cause the mechanical deformation of the piezoelectric material and the mechanical deformation of the waveguide so as to alter the optical path length of the waveguide by changing the physical length of the waveguide.

2. The optical integrated circuit of claim 1 wherein said optical waveguide forms a ring resonator.

3. The optical integrated circuit of claim 1 wherein said optical waveguide forms a linear resonator.

4. The optical integrated circuit of claim 1 wherein said device comprises first and second coupled waveguides and said transducer introduces a particular optical path length difference between the two waveguides.

5. The optical integrated circuit of claim 1 wherein said optical integrated circuit includes means for sensing the deformation of said piezo-electric material.

6. The optical integrated circuit of claim 1 wherein said optical integrated circuit includes means for relieving stress induced by the deformation of said piezo-electric material.

7. The optical integrated circuit of claim 1 further comprising means for damping mechanical vibrations of the piezo-electric material.

8. The optical integrated circuit of claim 1 wherein said piezo-electric region is incorporated as part of a non-piezo-electric base layer supporting said optical substrate.

9. An optical integrated circuit comprising:
   a piezoelectric base layer;
   a first electrode layer formed on a first surface of said piezoelectric base layer;
   a second electrode layer including a patterned drive electrode formed on a second surface of said piezoelectric base layer;

an optical substrate layer formed on one of said surfaces of the piezoelectric base layer; and an optical waveguide supported by said optical substrate layer, said drive electrode being patterned so that a voltage applied between the first electrode layer and the drive electrode mechanically deforms said piezoelectric base layer and mechanically deforms said optical substrate layer including said optical waveguide so as to alter the optical path length of the optical waveguide by changing the physical length of the optical waveguide.

10. The optical integrated circuit of claim 9 wherein said optical substrate layer is formed on said second surface of said piezo-electric base layer over said second electrode layer.

11. The integrated optical device of claim 9 wherein said second electrode layer includes said drive electrode and a grounded electrode portion.

12. The optical integrated circuit of claim 11 wherein said optical integrated circuit includes grounding means for grounding said grounded electrode portion comprising a passageway formed through said piezo-electric base layer, and a conductor positioned in said passageway connecting said grounded electrode portion with said first electrode layer.

13. The optical integrated circuit of claim 9 wherein said first surface of said piezo-electric base layer includes a recess formed therein.

14. The optical integrated circuit of claim 9 wherein said optical waveguide is curved so as to avoid regions of greatest compression of said piezo-electric base layer when a voltage is applied between said first electrode layer and said drive electrode.

15. The optical integrated circuit of claim 9 further comprising:

at least one slot formed within said piezo-electric base layer for relieving stress resulting from deformation of said piezo-electric base layer.

16. The optical integrated circuit of claim 15 wherein said at least one slot is formed in said piezo-electric base layer parallel to said optical waveguide.

17. The optical integrated circuit of claim 9 wherein said second surface of said piezo-electric base layer and said optical substrate layer are convex.

18. The optical integrated circuit of claim 9 wherein said waveguide forms a linear resonator.

19. The optical integrated circuit of claim 9 wherein said waveguide has a ring geometry and wherein said patterned electrode overlaps a portion of said ring waveguide for selectively altering the circumferential path length of said ring waveguide.

20. The optical integrated circuit of claim 9 wherein said optical integrated circuit comprises first and second coupled waveguides and first and second patterned electrodes for introducing a predetermined path length difference between the first and second waveguides.

21. The optical integrated circuit of claim 9 further comprising:

a sensing electrode formed on said second surface of said piezo-electric base layer for measuring deformations of the piezo-electric base layer.

22. The optical integrated circuit of claim 9 further comprising:

a piezo-electric sensing layer formed on said first electrode, the first electrode being juxtapositioned between a first surface of said piezo-electric sensing layer and said piezo-electric base layer; and a sensing electrode formed on a second surface of the piezo-electric sensing layer, wherein a deformation of the piezo-electric base layer deforms the piezo-electric sensing layer to produce a voltage on the sensing electrode.

* * * * *